United States Patent
Eriksson et al.

(10) Patent No.: US 11,283,791 B2
(45) Date of Patent: Mar. 22, 2022

(54) METHOD FOR RE-PROVISIONING A DIGITAL SECURITY CERTIFICATE AND A SYSTEM AND A NON-TRANSITORY COMPUTER PROGRAM PRODUCT THEREOF

(71) Applicant: Axis AB, Lund (SE)

(72) Inventors: Magnus Eriksson, Lund (SE); Stefan Andersson, Lund (SE); Fredrik Hugosson, Lund (SE); Jerry Olsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/167,106

(22) Filed: Feb. 4, 2021

(65) Prior Publication Data
US 2021/0258300 A1    Aug. 19, 2021

(30) Foreign Application Priority Data
Feb. 13, 2020 (EP) .................................. 20157046

(51) Int. Cl.
*H04L 29/06* (2006.01)

(52) U.S. Cl.
CPC ...... *H04L 63/0823* (2013.01); *H04L 63/0442* (2013.01); *H04L 63/083* (2013.01); *H04L 63/0861* (2013.01); *H04L 63/166* (2013.01)

(58) Field of Classification Search
None
See application file for complete search history.

(56) References Cited

U.S. PATENT DOCUMENTS 8,015,399 B2 * 9/2011 Imai .................... H04L 63/0823
                                                          713/156
10,277,406 B1   4/2019 Veladanda et al.
(Continued)

FOREIGN PATENT DOCUMENTS

EP    3413224 A1   12/2018
EP    3425842 A1    1/2019
(Continued)

OTHER PUBLICATIONS

"Information Technology- Security Techniques—Public Key Infrastructure—Practices and Policy Framework", Security controls and services, 27th meeting of ISO/IEC JTC 1/SC 27/WG 4, Dec. 12, 2018, pp. 1-103.
(Continued)

*Primary Examiner* — Piotr Poltorak
(74) *Attorney, Agent, or Firm* — Xsensus LLP

(57) ABSTRACT

A method for re-provisioning a user equipment (UE, 140) after a first digital security certificate for the UE (140) has expired includes communicating content data to a controller (130) over a first secure communication channel after verification of a validity of a first digital security certificate. Once it is realized the first digital security certificate has expired, the UE (140) sends a certificate provisioning request message over an unsecure channel to the controller (130) as a request to the controller (130) to provision a second digital security certificate. The UE (140) signs the certificate provisioning request message with the private key for the now expired first digital security certificate. A second digital security certificate is signed by the rescue-secret private key at the controller (130) and sent to the UE (140), which verifies its authenticity with the corresponding rescue-secret public key.

14 Claims, 6 Drawing Sheets

(56) References Cited

U.S. PATENT DOCUMENTS

| | | |
|---|---|---|
| 2002/0144108 A1 | 10/2002 | Benantar |
| 2004/0243805 A1 | 12/2004 | Enokida |
| 2005/0204164 A1* | 9/2005 | Kakii .................... H04L 9/3268 726/5 |
| 2006/0047951 A1 | 3/2006 | Reilly et al. |
| 2007/0055865 A1* | 3/2007 | Kakii .................... H04L 9/3263 713/156 |
| 2017/0195124 A1 | 7/2017 | Obaidi et al. |
| 2019/0074982 A1 | 3/2019 | Hughes |
| 2019/0140849 A1 | 5/2019 | Kravitz et al. |
| 2019/0149316 A1 | 5/2019 | Pala et al. |

FOREIGN PATENT DOCUMENTS

| | | |
|---|---|---|
| WO | 03/015370 A2 | 2/2003 |
| WO | 03/015370 A3 | 4/2003 |
| WO | 2006/009288 A1 | 1/2006 |
| WO | 2016/129858 A1 | 8/2016 |
| WO | 2016/200656 A1 | 12/2016 |
| WO | 2018/160863 A1 | 9/2018 |
| WO | 2019/049724 A1 | 3/2019 |

OTHER PUBLICATIONS

Extended European Search Report dated Aug. 14, 2020, received for EP Application 20157046.2, 12 pages.

* cited by examiner

METHOD FOR RE-PROVISIONING A DIGITAL SECURITY CERTIFICATE AND A SYSTEM AND A NON-TRANSITORY COMPUTER PROGRAM PRODUCT THEREOF

CROSS REFERENCE TO RELATED APPLICATION

The present application is based on and claims priority of European Patent Application No. 20157046.2 filed on Feb. 13, 2020, the entire contents of which are incorporated herein by reference.

FIELD

The present disclosure relates to automated certificate management and more particularly to a method for re-provisioning a security certificate, such as a Transport Layer Security (TLS) certificate or a Secure Socket Layer (SSL) certificate and a system and a non-transitory computer program product thereof.

BACKGROUND

A "digital certificate", also known as a digital security certificate, an automated public key certificate, or identify certificate, is used to securely associate rights of a public key with a computing device that has that key stored therein. Service providers (e.g., websites) often use digital certificates so a browser on a user's device confidently knows the service provider is actually who the service provider claims to be. Digital certificates include public key identification of information about the device that holds that public key, raw data, and a digital signature associated with the digital certificate of the public key generated by the certificate issuing party.

Conventionally, a secure link is established with a Transport Layer Security (TLS) protocol with a series of steps, initiated by a browser of a user equipment (UE). The UE's browser requests a secure page be served to it (e.g., https:// . . . ). The web server then sends its public key to the UE's browser along with the web server's certificate (data files describing an organization's details that are digitally bound via a cryptographic key). The UE's browser then checks that the web server's certificate was issued by a trustworthy party, is still valid, and the certificate is properly related to the web server's web site. If all is okay, the UE's browser uses the public key, which was sent from the web server, to encrypt a random symmetric encryption key unique to the UE's browser, along with other encrypted http data, and sends the same to the web server. In response, the web server decrypts the UE's public key (and data) using the web server's private key. Subsequently, the web server, which now has all the information it needs to establish a secure two-way communication channel, then replies with data encrypted by the symmetric key. Because the UE's browser has the private key that is paired with the public key used by the web browser to encrypt the data sent to it, the web browser is able to decrypt the content of the reply message and present the information on a display or in another fashion that is useful to the user.

Encryption using a public/private key pair is used to prevent the contents of a message from being accessed by third parties who may intercept a message when sent over a communication channel. The message is encrypted with a recipient's public key so the recipient can decrypt the message with their private key. Public/private key pairs can also be used to sign a message. The purpose of a signature is not to prevent the message from being intercepted, but to provide proof of the authenticity of the source of the message (i.e., the message was really sent from the person who claims to have sent it). To generate a signature typically a hash is made from the plain text message, the hash is then encrypted with the sender's private key, and then encrypted hash is appended to the plaintext.

SUMMARY

As recognized by the present inventors, conventional systems require a lengthy and time-consuming process to re-provision a security certificate after the security certificate has already expired. Moreover, during first provisioning, a security certificate is provided that validates the authenticity of the web server and that security certificate is valid for a limited time. If the UE connects to the controller frequently (e.g., such as when docking the UE to a local computer that uses the security certificate to communicate on a secure channel with the controller), the UE can use conventional procedures to automatically re-provision the certificate before that security certificate expires. However, if security certificate has already expired, there is no convenient mechanism to automatically re-provision the UE with a new security certificate because the security certificate is the mechanism by which the UE and controller maintain trusted and secure communications.

In light of this issue, the present inventors recognized that the controller can help re-provision a certificate for the UE as long as the controller maintains a copy of the last public key of the UE associated with the now-expired security certificate. Moreover, after the UE realizes the security certificate has expired, the UE sends a rescue request to the controller (or other rescue address) that is signed with the UE's private key for the now-expired security certificate. In response to this rescue request, the controller verifies the signature with the public key of the now-expired certificate. The verified signature then triggers a notification within the controller that the UE has automatically requested a new certificate, and the controller responds, for example, by viewing a tag attached to data of a file, such as an image data file, from the UE showing that the file was created prior to the expiration of the UE's security certificate. Alternatively, the content data sent from the UE is tagged at the controller so the content data is marked as having been uploaded during a time after the certificate was expired. Downstream processes will thus be warned that the content data was previously associated with a certificate that was valid, but no longer valid at a time of uploading of the content data. In this situation, the administrator may set the controller to a state where the content data is stored, but then also a trigger for automatic retrieval of a rescue-secret used for the purpose of provisioning the UE with a new certificate. Alternatively, the request to the rescue address prompts an administrator (or a computer-based administrative process, such as check a log of approved, and not-approved users) of the controller to verify that the administrator wishes to approve the re-provisioning request and does so by entering a protected passphrase (an example of access information) to unlock the re-provisioning information. If the controller decides to re-provision the UE with a new certificate, the new certificate is sent to the UE that is signed with the private key associated with the rescue address, and the UE verifies the new certificate with the public key for the controller which was provided to the UE at its initiation setup with the controller.

According to one embodiment, a method is described for re-provisioning a user equipment with a second digital security certificate after a first digital security certificate has expired, the method includes before the first digital security certificate has expired, communicating with a controller over a first secure communication channel, the first digital security certificate having previously been validated with a first public/private key pair; storing a rescue-secret private key at the controller and storing a rescue-secret public key at the UE, the rescue-secret private key and the rescue-secret public key being a rescue-secret public/private key pair that is different than the first public/private key pair; determining that the first digital security certificate has expired; sending a certificate provisioning request message over an unsecure channel to the controller as a request to the controller to provision the UE with the second digital security certificate, the certificate provisioning request message being signed by a private key of the first public/private key pair; using a public key of the first public/private key pair at the controller to verify the certificate provisioning request message, and once verified, accessing at the controller the rescue-secret private key via entry of access information; signing at the controller the second digital security certificate with the rescue-secret private key and sending a signed second digital security certificate from the controller to the UE, and after verifying the signed second digital security certificate at the UE, using the rescue-secret public key to resume communication with the controller over another secure communication channel using the second digital security certificate.

According to another embodiment, a user equipment (UE) that includes a housing configured to be mounted to a movable platform; a camera contained in the housing, the camera including imaging circuitry configured to capture content data; a memory that holds a private key of a first public/private key pair, and a rescue-secret public key of a rescue-secret public/private key pair that is different than the first public/private key pair, wherein a rescue-secret private key of the rescue-secret public/private key pair being held in a secure memory at a controller and is accessible by entry of access information; and circuitry configured to determine that a first digital security certificate has expired, which prevents uploading of the content data over a first secure communication channel to the controller, sign a certificate provisioning request message with the private key of the first public/private key pair associated with the first digital security certificate after the circuitry determines that the first digital security secret has expired, and send a signed certificate provisioning request message over an unsecure channel to the controller as a request to the controller to provision a second digital security certificate, receive the second digital security certificate from the controller in response to the controller using the at least a portion of the access information to retrieve the rescue-secret private key that is used by the controller to sign the second digital security certificate, and verify the second digital security certificate with the rescue-secret public key of the rescue-secret public/private key pair, and resume secure communication with the controller over another secure communication channel using the second digital security certificate.

According to another embodiment, a non-transitory computer readable storage is described and has computer readable instructions that when executed by a processor perform a method of re-provisioning a user equipment (UE) with a second digital security certificate after a first digital security certificate has expired, the method including: storing a rescue-secret private key at a controller and storing a rescue-secret public key at the UE, the rescue-secret private key and the rescue-secret public key being a rescue-secret public/private key pair that is different than a first public/private key pair used with the first digital security certificate; determining that the first digital security certificate has expired, which prevents uploading of content data from the UE to the controller over a first secure communication channel; sending a certificate provisioning request message over an unsecure channel to the controller as a request to the controller to provision the second digital security certificate, the certificate provisioning request message being signed by a public key of the first public/private key pair; using at least a portion of access information at the controller to access the rescue-secret private key, signing the second digital security certificate with the rescue-secret private key; and verifying the second digital security certificate at the UE using the rescue-secret public key to establish communication over a second secure communication channel.

While TLS and TLS certificates are used herein as an example, it should be understood that Secure Socket Layer (SSL) and SSL certificates, or other security protocols and certificates that authenticate the identity of a website, and help secure a communication channel with that website, may also be used consistent with the present teachings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
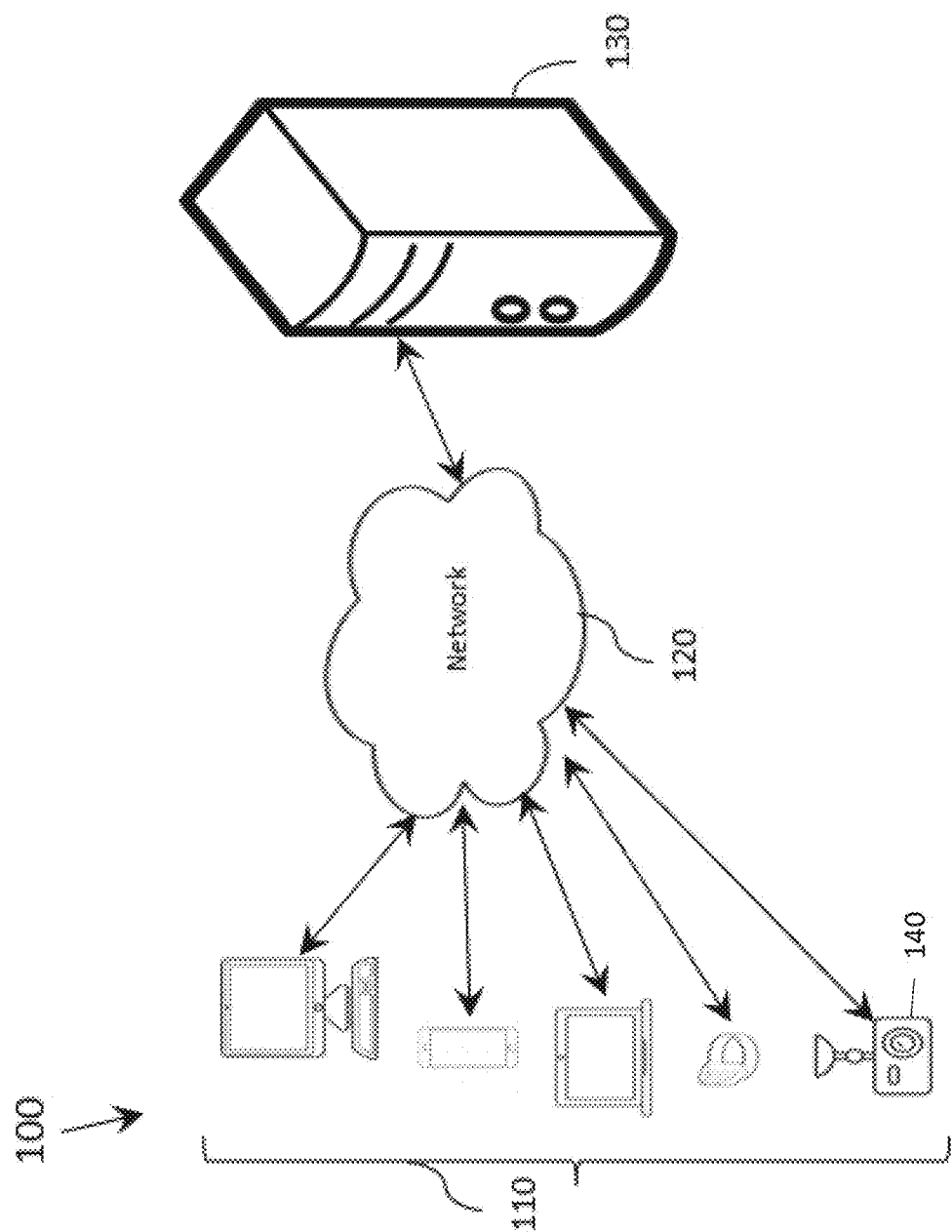
FIG. 1 is a system level diagram of an exemplary network environment to which various aspects of the present disclosure may be implemented, in accordance with an embodiment.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof. Circuitry that is "configured to" perform an operation may be accomplished with a, or more than one, programmable device (e.g., microprocessor, graphics processing unit, or the like) that is configured by the software to perform the operation. Likewise, the programmable device may be implemented in firmware, or hardwired (e.g., ASIC or PLA) to perform the operation.

The embodiments herein and the various features and advantageous details thereof are explained more fully with reference to the non-limiting embodiments that are illustrated in the following detailed description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As recognized by the present inventors, a problem exists with conventional use of TLS certificates in that device and controller certificates have a same validity period, which may be short. Although a method exists to roll a yet-to-expire certificate to another certificate before the yet-to-expire certificate has expired, this does not address particular problems experienced by an infrequent end-user. Moreover, a problem exists for sporadic or infrequent users when he or she attempts to send secure data to the controller, and thus becomes frustrated to learn that the certificate has expired and their UE is locked-out because they need to obtain a new certificate before they can upload their data. This frustrating user-experience is compounded when the validity time period of certificate is set to a short period, such as hours, days or a week or so, and the provisioning of the new certificate is strictly controlled. Also, as recognized by the present inventors, management of first responder organizations (e.g., police, fire and rescue, or emergency medical technician, EMT) may have a challenge to encourage their first responders to comply with uploading of video information in a timely fashion after their daily activities. If the process is cumbersome, the responders will be reluctant to comply in a timely manner. On the other hand, if management tries to simplify the process by removing the requirement to upload image/audio data (still images as well as video and audio) over a highly secure communication channel, the potential exists for sensitive data to be compromised by bad-actors.

In view of these technical and practical problems, the present inventors identified a convenient and secure approach to rapidly and conveniently re-provision certificates that have already expired by repurposing keys from an expired certificate. Initially, when provisioning an initial certificate, the a UE and a controller establish a second private/public key pair used for a rescue situation (i.e., where the UE needs to verify a new digital security certificate because the old one has already expired), in addition to a first private/public key pair for routine secure communications associated with the initial certificate. The second private/public key pair is not used until the certificate has already expired (i.e., a rescue situation). Accordingly, once the UE recognizes the certificate has expired, the UE signs a rescue request message (also referred to as a "certificate provisioning request message") with the private key of the expired certificate, and addresses the request to the controller (or another device having a "rescue address"). Once the request is made by the UE, the controller validated that request via application of the UE's public key, which the controller retained despite the fact that the certificate associated with that public key has already expired. If the controller decides to issue a new certificate to the UE, an administrator (or a computer-based process) approves the request via entry of a protected passphrase (or other mechanism as will be discussed). Subsequently, the controller issues a new certificate that it signs with its private key from the second key pair (key pair for the rescue situation). The UE then verifies the new certificate by applying its public key from the second key pair which it had stored in memory as part of the provisioning of the original certificate. The UE may then confidently rely on the new certificate in its communication with the controller.

In view of the above, the present inventors identified a need to overcome the aforementioned problems of conventional methods by re-provisioning a digital certificate from a server when a previously-used digital certificate has already expired.

Referring to the drawings, a context for the present disclosure will be described in more detail. FIG. 1 illustrates an exemplary environment 100 to which various embodiments of the present disclosure may be implemented. As shown in FIG. 1, the environment 100 includes UE devices 110 (any one of which could be described singularly as a in FIG. 1, as "UE 110" or "UE's 110"), a network 120 and a controller 130. The UE's 110 may be a client machine, a laptop, a tablet, a wearable device, a smartphone, a dashcam, a vehicle camera, or a computer, etc. Without limiting the scope of the present disclosure, exemplary embodiments will be described herein where the UE includes wearable video cameras worn by law enforcement officials, dashcams disposed in the interior cabin of a police cruiser, and exterior cameras mounted to (or in, such as integrated into a vehicle's body panel) a vehicle that capture video about a periphery of a vehicle. Although the descriptions provided herein will use the term "video" for illustrative purposes, it should be understood that the video and more generally "image data" or simply "content data" optionally includes audio captured by a microphone in the UE. Furthermore, the video need not be limited to the visible spectrum and may include infrared and/or ultraviolet image sensors so that images outside of the visible spectrum are captured. "Content data" is intended to be construed broadly, and optionally may include not only image data, video data, and/or audio data captured by the UE, but also data that may be derived from data captured by the UE, such as features extracted from the captured data. A non-limiting example of such content data is an indication of one or more objects detected from captured image and/or audio data such as a license plate of a vehicle, or an identification of a person detected in an image, and the like. The features may be extracted via a pre-configured image and/or audio detection filter that matches captured information against stored files of features that are sought in the captured data. A match within a predetermined threshold results in a positive detection result. Alternatively or complementary, a machine learning algorithm such as linear or logistic regression, decision tree, random forest, K-means clustering, support vector machine (SVM), naive Bayes, and gradient boosting (GB) (e.g., GB Machine, XGBoost, LightGBM and CatBoost).

As an exemplary use case, suppose a law enforcement officer wears a UE 140, which is one example of the UE's 110 in FIG. 1, and that UE 140 is arranged as a wearable body camera (2300), as will be discussed later with respect to FIG. 2. The officer attaches the UE 140 to his or her clothing, service belt, or by some other fashion and turns on the UE 140. The UE 140 may automatically turn-on as well, as triggered by a variety of mechanisms including, NFC connection with a reader when leaving the station, a proximity detector to the police cruiser, Bluetooth connection to a service radio, or the like. The UE 140 operates in one of several user-settable modes such as continuous recording of audio/video, proximity recording, such as when the officer is a predetermined distance away from the police cruiser, or station house, or intermittent mode, such as being turned on manually via a push button, or a remote interface (e.g., smartphone). The UE 140 records events throughout the officer's shift. Optionally, the UE 140 stores the video recordings with date/time meta-data tags which provide a digital record of when the recording were made. These date/time tags may later be used by the controller 130 in an automated process to validate an authenticity of files provided from the UE 140 even though the security certificate may have expired. Moreover, the tags may be used by the controller 130 as validation that the controller 130 should affirmatively respond to a rescue message request sent from they UE 140 to provide a new certificate for the UE 140 to replace the expired certificate.

Certificates expire prior to auto-reprovisioning, for a variety of reasons. For example, the officer may not immediately upload the day's video recordings to the controller 130 via the network 120. For example, the end of the officer's shift may place the officer at an accident scene, at a jail when incarcerating a suspect, or at a hospital admitting a patient. For whatever reason, it may not be convenient for the officer to upload the digital content at that time to the controller 130. Suppose the officer then has a few days of vacation, or has a desk assignment for a week or so. After that, the officer returns to their beat and uses the UE 140 again. At the end of the officer's shift, and when attempting to dock their body camera to a local computer (collectively the UE 140 in this example) upload the content to the controller 130, perhaps more than a week has transpired since the last uploading of digital content the UE's TLS certificate may have expired. If the management structure of the police force requires use of TLS certificates with a relatively short validity period (e.g., 1 week in this example), the officer will not be able to immediately upload the digital content because the UE 140 will be locked by virtue of the certificate having expired. Because the officer did not frequently use the secure TLS channel, there was no opportunity to automatically roll the present unexpired certificate to a new certificate, and thus the officer would be faced with having to obtain a new certificate so as to be able to communicate with the controller 130. One can easily imagine this would not be a pleasant activity for a police officer, especially after just completing his or her shift.

In light of this situation, and as will be discussed in greater detail with respect to the other figures, an embodiment of the system shown in FIG. 1 allows the officer to respond to a situation where the UE 140 is prevented from uploading his or her video data to the controller 130. Accordingly, from the officer's perspective, whether attempting to upload the video file directly from the UE 140 or via an intermediate computer (e.g., a local host computer to which the UE 140 docks via a wired or wireless interface) to the controller 130, the officer can merely reestablish a secure connection by dispatching a certificate provisioning request message signed with the UE's private key from the expired TLS certificate.

A presumption under this use-case is that the UE 140, once provisioned with a TLS certificate associated with a controller, only communicate with that controller. The controller 130 may also communicate with other devices as well, although it only accepts connections from devices that have been provisioned to it. The controller 130 not only keeps the public keys for various UE's that have a presently active TLS certificate, but also maintains another private key (in addition to the one used with the presently active TLS certificate) for the various UE's to be used to re-provision a certificate, in a rescue situation, where the UE's TLS certificate has already expired. Moreover, the controller 130 responds to a certificate provisioning request message that is signed by the UE's private key associated with the expired certificate, after verifying the certificate provisioning request message with the controller's paired public key of the expired certificate for the UE 140, by issuing a new certificate signed with a different private key (used for rescue situations) for which the UE 140 has a matching public key that was kept in memory for ultimate use in a rescue situation.

Regarding components of the UE's 110 (FIG. 1), they may be powered by a continuous DC power supply (e.g., such as for a dash cam tethered to a source of electric power supplied by the vehicle, or a wiring harness in the case of video cameras integrated into the body of vehicle to capture all or part of a periphery of the vehicle). In the case of a wearable camera, a battery-based power supply is used, although alternative sources may be used as well, such as a USB-C connection to a battery bank, or another source such as a solar panel.

The UE's 110 optionally includes a display, such an LCD screen or an LED screen. Also, the display is adapted to display an expiry status of a Transport Layer Security (TLS) certificate. As will be discussed with regard to FIG. 2, the UE's 110 includes an interface (e.g., 2140) that allow the UE's 110 to physically, or via a paired wireless connection such as Bluetooth or near-field connection (NFC), connect to an external computer resource that provides a relay capability to facilitate communication exchanges with the controller 130. Additionally, the UE's 110 optionally include a peripheral input/output interface provided for receiving input from a keypad, a joystick, a mouse, and a trackball etc. In various other embodiments, the display and the input/output interface have been integrated into a capacitive-touch or similar touch-based screen device.

The UE's 110 have further computing capabilities, such as, a processor and a memory. In various embodiments, the processor is one of, but not limited to, Field Programmable Gate Array (FPGA), Application Specific Integrated Circuit (ASIC), general purpose or an ARM based processor. Additionally, the memory is one of, but not limited to, EPROM, EEPROM, random access memory (RAM) and Flash memory etc. The UE's 110 have additional storage capabilities in form of a non-transitory memory, including a secure memory that is encrypted for safe keeping of data, such as a rescue-secret. In addition, the memory stores application programs, having computer readable instructions that when executed by a processor, control device operations.

The UE's 110 connect to the network 120 as shown in FIG. 1. The network 120 is one of, but not limited to, a wired network such as an Ethernet connection, universal serial bus connection, IEEE 1394 (Firewire) connection, or the like. Further, the network 120 may be, but not limited to, a wireless network, a Local Area Network (LAN) or a Wide Area Network (WAN) implemented through a number of protocols, such as but not limited to, 802.x, Bluetooth, ZigBee or the like. Also, the network 120 provides for external communication via Global Systems for Mobile Communication (GSM), Public Switched Telephone Network (PSTN), Voice and Video Conferencing Over Internet Protocol (VVOIP). In one embodiment, the network 120 is a public network, such as the Internet, and the network 120 is made of various combinations of the above described connections, LAN's and/or WAN's, with mixed wired/wireless segments.

Also connected to the network 120 is the controller 130. The controller 130 is adapted to receive the request regarding the re-provisioning of the TLS certificate, from the UE's 110. To prevent intervention and/or eavesdropping, a secured link is established between the controller 130 and the UE's 110. In other words, establishing a communication link between the controller 130 and the UE's 110 that is encrypted in at least one direction so that confidential information may be passed between the controller 130 and the UE's 110. Additionally, the UE's 110 may communicate with the controller 130 via a TLS transaction.

Figure 2:
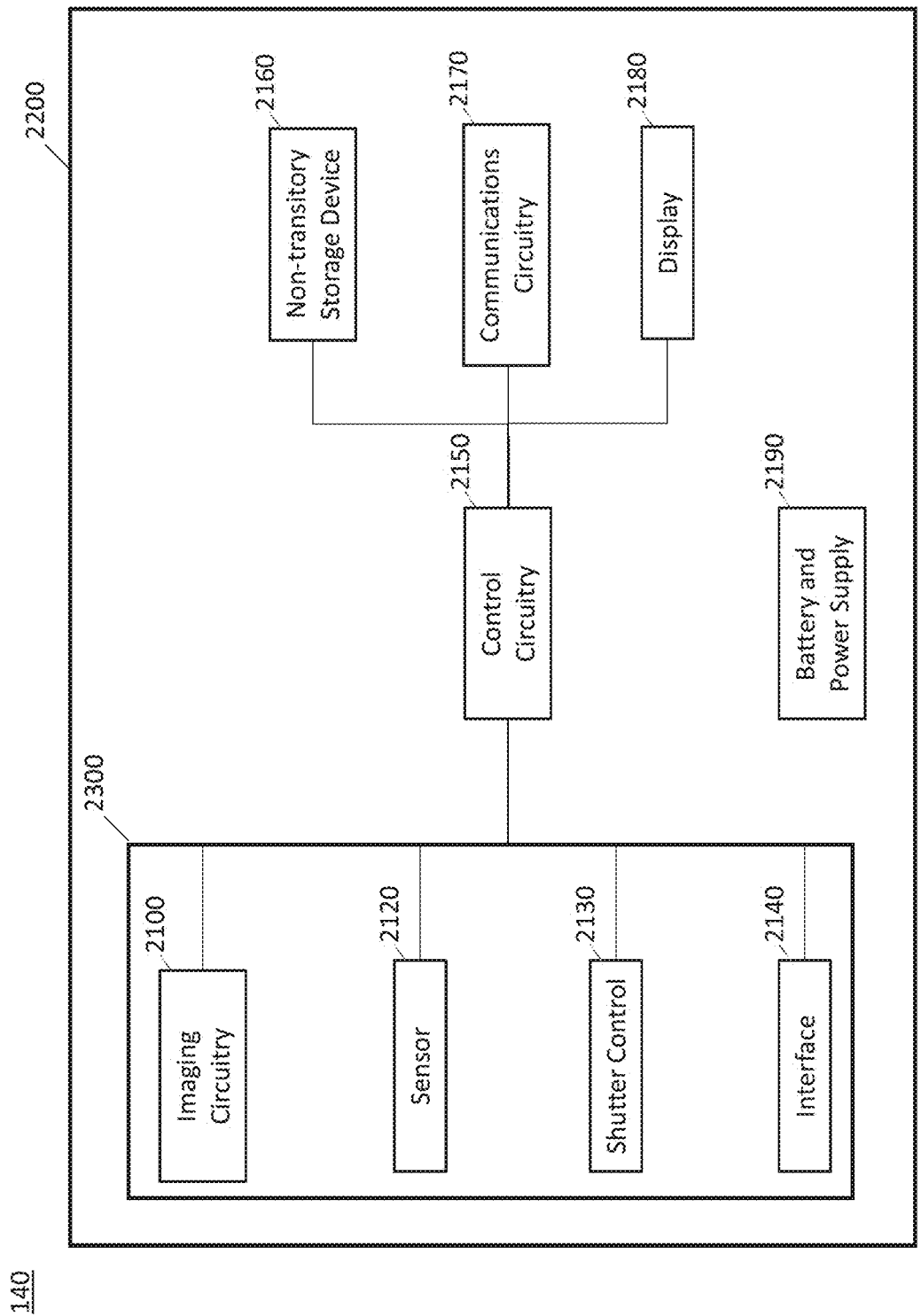
FIG. 2 is a diagram of processor circuitry of a client wearable body-camera, a dashcam, or a vehicle mounted video camera, which collaborates with a control device to automatically re-provision a TLS certificate after a previous TLS certificate has already expired, in accordance with an embodiment of the present disclosure.

FIG. 2 is an explanatory diagram illustrating a functional configuration example of UE 140 (which is referring to one UE of the UE's 110 in FIG. 1) according to an embodiment of the present disclosure. Hereinafter, a functional configuration of UE 140 according to an embodiment of the present disclosure will be described using FIG. 2. UE 140 has a housing 2200 that includes a camera 2300, which includes imaging circuitry 2100, a sensor 2120, a shutter control 2130, and an interface 2140. Other components included in the housing 2200 of the UE 140 include a control circuitry 2150, non-transitory storage device 2160, a communication circuitry 2170, a display 2180, and a battery and power supply 2190. These other components may optionally be included within the camera 2300.

The imaging circuitry 2100 includes a lens, an image sensor (e.g., CMOS sensor), and the like, and accumulates electrons for a predetermined period, according to an image that is formed on a light receiving surface of the image sensor through the lens. Then, the imaging circuitry 2100 outputs a signal according to the accumulated electrons to the control circuitry 2150. The control circuitry 2150 executes imaging processing using a signal output from the imaging circuitry 2100 to generate a video stream. Once again, the video is at least one of a still image, a moving image (video) in the visible spectrum, as well as images outside of the visible spectrum, such as imagines in the Infrared and Ultraviolet spectral ranges.

As previously discussed, the UE 140 according to the present embodiment may execute imaging processing when the user actuates a user interface e.g., presses down the shutter control 2130, or via interface 2140.

The sensor 2120 contains multiple sensors, including a microphone for acoustic pickup. Also, the sensor 2120 includes a motion detector that can trigger the operation of a video recording session during an event. Optionally, the sensor 2120 is connected to a vehicle controller such that when the vehicle enters a predetermined mode of operation (e.g., sirens turned on, vehicle stopped but still running, which is an indication of a traffic stop, etc.) the sensor 2120 triggers a recording operation. The sensor 2120 is provided to face the same direction as an imaging direction of the imaging circuitry 2100.

The sensor 2120 may further include a location sensor, an acceleration sensor, a gyro sensor, a geomagnetic sensor, a temperature sensor, a barometric pressure sensor, a heartbeat sensor, a timer, and date/time recorder. As the location sensor described above, specifically, a Global Navigation Satellite System (GNSS) receiver and/or a communication device may be included, for example. GNSS may include, for example, Global Positioning System (GPS), Global Navigation Satellite System (GLONASS), BeiDou Navigation Satellite System (BDS), Quasi-Zenith Satellites System (QZSS), and Galileo. Positioning technologies may include, for example, a wireless LAN, Multi-Input Multi-Output (MIMO), cellular communication (e.g., position detection using a mobile base station, a femtocell), and near field communication (e.g., Bluetooth Low Energy (BLE), Bluetooth. The sensor may further include a biometric interface sensor for fingerprint authentication of a user, vein recognition, facial detection, retina detection and other mechanisms. The biometric data of the user may be an alternative or a complement to a passphrase used to unlock the rescue-secret discussed above. Moreover, as part of the certificate re-provisioning process, the biometric data uniquely authenticates the user so as to release the saved rescue-secret stored in the controller 130. Using the biometric data (or other incorruptible file such as a file saved in blockchain) for authentication as an alternative to passphrase protection for unlocking the rescue-secret. Likewise, using the date/time meta-date recorded with the image data may also be used to trigger automatic retrieval of the rescue-secret private key, as discussed above, and will further be discussed below.

The shutter control 2130 is computer actuated, although another a button is provided that response to a press by a user to capture a still image.

The interface 2140 includes a man-machine interfaces, such as a power button, mode select button, or touch panel to provide local control of the UE 140. The interface 2140 also includes electrical connections so peripheral devices (e.g., memory, auxiliary camera, auxiliary power, etc.) may be connected to the device. In a dashcam embodiment, the interface provides an external DC power port. In an embodiment where the UE (140) is a camera (2300) attached to, or contained in, the body of the vehicle, the interface includes a bus connection and power connection to the vehicle's wiring harness so as to provide power and data interface the vehicle's power supply and computer and communication resources.

The control circuitry 2150 is configured with a processor, such as a central processing unit (CPU), a ROM, and a RAM, and controls operation of each part of the UE 140. In the present embodiment, the control circuitry 2150 manages the collection of image/audio data from the imagine circuitry, and fuses it with the sensor data, as needed, to prepare to upload the video information to the controller 130 via the communication circuitry 2170.

The non-transitory storage device 2160 is configured with, for example, a flash memory or another nonvolatile memory. The non-transitory storage device 2160 stores an image generated by the control circuitry 2150 executing imaging processing.

The communication circuitry 2170 executes wireless communication with another apparatus, such as the controller 130 or an relay computer to the controller 130, or a cloud server on a network by, for example, cellular communication, Wi-Fi, Bluetooth (registered trademark), or Near Field Communication (NFC). However, the communication circuitry 2150 also performs wired communications with a relay computer via a physical interface, such as USB-C or the like. In one example the UE 140 is tetherable to a computer, where the computer performs the communication steps described herein to establish the secure channel, and also re-provision the TLS certificates as described herein.

The display 2180 is a display device configured with, for example, a liquid crystal display, an organic EL display, or an LED display. Display content on the display 2180 is controlled by the control circuitry 2150.

The battery and power supply 2190 is configured with a rechargeable battery, and supplies power to each part of the UE 140.

The functional configuration example of the UE 140 according to an embodiment of the present disclosure has been described above using FIG. 2. Note that the UE 140 does not need to include the entire configuration illustrated in FIG. 2. For example, the UE 140 does not necessarily include the display 2180. Moreover, the UE 140 may include one or more other structural elements than those illustrated in FIG. 2. For example, the UE 140 may include a microphone array for recording directional sound (with a gain) in associated with the capturing of video.

Figure 3:
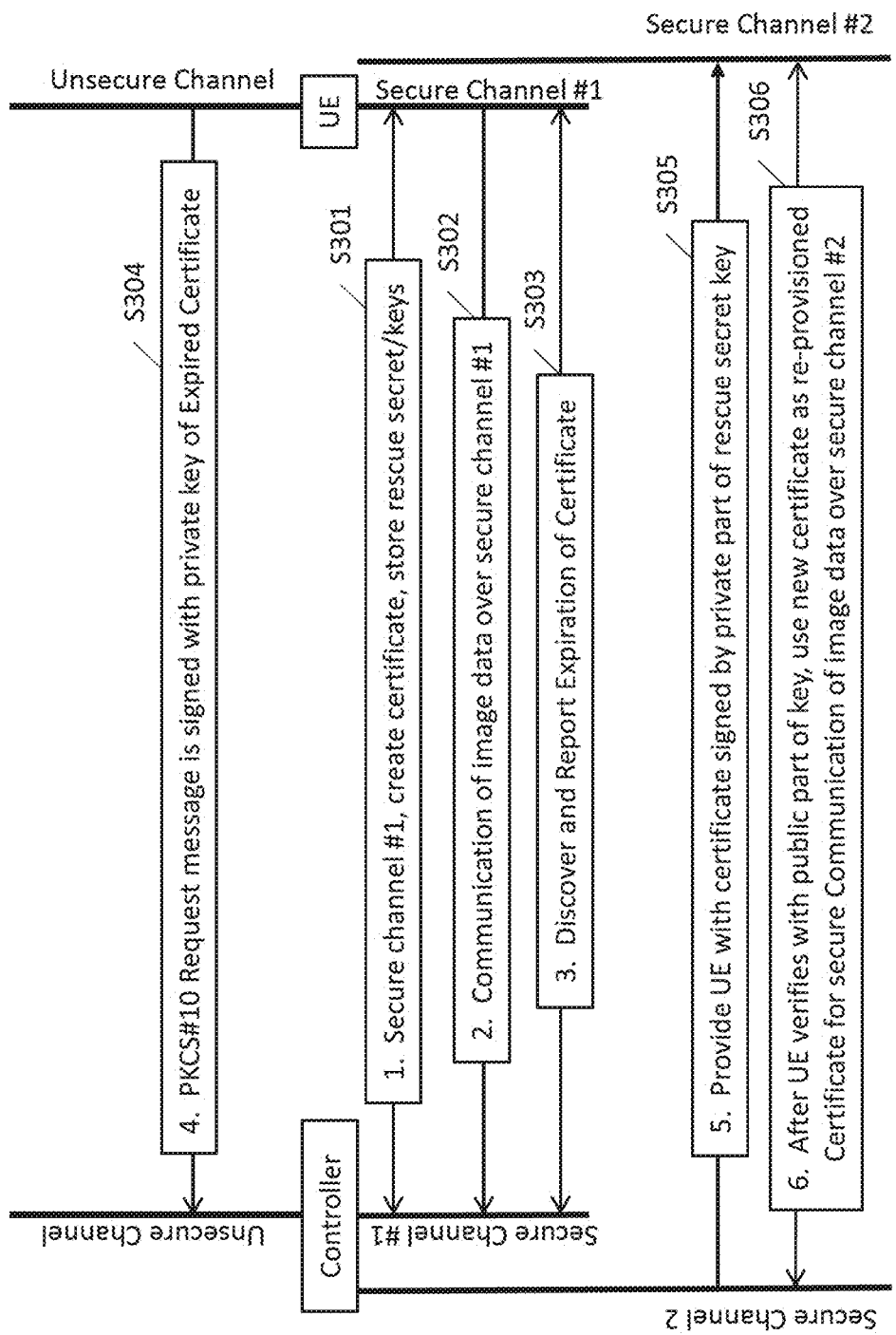
FIG. 3 is a signal diagram that illustrates a sequence of messages exchanged on various secure and unsecure channels to re-provision the TLS certificate after expiration of the previous TLS certificate in accordance with an embodiment of the present disclosure.

FIG. 3 is a signal diagram showing messages passed between the controller 130 and the UE 140 from when a first secure channel is used, to an expiration of the TLS certificate, to re-provisioning a new TLS certificate, to using the new TLS certificate to establish a second secure communication channel.

Initially, in a first set of messages, S301, communications are established between the controller 130 and UE 140 on a first secure channel (secure channel #1). The first secure channel is established with additional steps than those discussed in the background. The controller 130 also coordinates on providing a second key pair ("rescue key pair") to be used by the UE 140 and controller to coordinate in a rescue situation where the original TLS certificate expires, and the UE 140 requests a new TLS certificate, as will be discussed. The UE 140 stores the public rescue key of the controller 130, and the controller 130 stores its private rescue key (a component of a "rescue secret") in a secure memory that is unlocked by an administrative process performed on the controller 130 in response to receiving a passphrase that enables access to the rescue-secret and thus the re-provisioning process. The rescue-secret and passphrase go hand-in-hand in that the rescue-secret is needed for the provisioning of a new certificate and the entry of the passphrase unlocks access to the rescue secret. As such, the term "rescue secret information" may be used as an expression to include both the passphrase and the rescue-secret. While a passphrase is used as one example, other information besides a passphrase may be used such as biometric data, a verified data file saved in blockchain, or the like. During an initial setup between the controller 130 and the UE 140, the UE 140 not only receives the TLS certificate signed by the first private key of the controller 130, but also a rescue-secret public key that is used by the UE 140 to receive a re-provisioned TLS certificate from the controller 130 when the original TLS certificate has expired and the UE 140 requests a new certificate via a rescue message, as will be discussed.

In the second set of messages, S302, the controller 130 and UE 140 continue secure communications over the first secure channel, such as by uploading image data from the UE 140. In S302 the original TLS certificate is valid. Also, the UE 140 during this time tags files with a date/time stamp, which may be used later to verify an authenticity of the UE 140 as part of an automated re-provisioning process.

In the third message set, S303, the UE 140 discovers that the UE 140 no longer has a valid client certificate and thus the video data on the UE 140 is locked and not able to be uploaded to the controller 130. In order to reestablish secure communications, another client certificate needs to be provisioned. Rather than follow a normal provisioning process, the UE 140 can dispatch (in the fourth message set, S304) a PKCS #10 request message from the UE 140 after being signed with the UE's private key for the expired certificate. To verify the signature in the request message, the controller 130 uses a retained copy of the public key used in association with the now expired TLS certificate. Conventionally, public keys are no longer kept by the controller 130 because the certificate associated with that public key is no longer valid. However, by UE 140 retaining the private key (for the now expired TLS certificate) to sign the PKCS #10 request message, and by the controller 130 retaining the public key (for the now expired TLS certificate), the controller 130 is able to verify authenticity of UE 140. The signature is verified (by virtue of being able to decrypt and unhash the signature portion of the PKCS #10 request message with the retained public key.

In response, in the fourth set of messages, S305, the controller 130 receives the request message from the UE 140, retrieves the public key associated with that UE that was formerly used in communications with that UE 140 while the original TLS certificate was valid, and uses the public key to verify the authenticity of the request message from the UE 140. Once the request message is authenticated by the controller 130, the controller identifies the state of the UE 140 as being in a rescue state. The controller 130 keeps track of expiration statuses of TLS certificates for various UE's served by the controller 130, and thus the controller 130 is able to recognize whether it is reasonable to expect a rescue request from a particular UE based on whether the UE's certificate has expired or not. If it has, the controller 130 can then prompt an administrator to verify whether the administrator wishes to issue a new TLS certificate to the UE 140, or not. Alternatively, an automated process may be performed where in the request message (or associated message) the meta-data tag from the image files provided by the UE 140 are checked to see if the date/time of the file matches a date/time when the original TLS certificate for that UE 140 was still valid. If so, the controller 130 can reasonably conclude the rescue request from the UE 140, which is signed by the key from the expired TLS from that UE 140, is a legitimate request.

Assuming the controller 130 verifies the rescue request is legitimate, and the and an administration process at the controller agrees the UE 140 should receive a new TLS certificate, the controller 130 then receives a passphrase (e.g., a character string, or merely specific data, such as a binary string) in the form of an input from an administrator that protects the rescue key for that UE 140. The rescue secret may also be in the form of a control signal from the controller 130, after the controller 130 determines (1) the date/time from meta-data tag coincides with a date/time when the expired TLS certificate had not yet expired, and (2) the rescue message was signed with the private key associated with the expired TLS certificate. Entry of the rescue secret provides access to the rescue-secret private key, so the controller 130 can sign a new TLS certificate with the rescue-secret private key before sending the same to the UE 140. In reply, in the sixth set of messages of S307, the UE 140 verifies the certificate by using the public key part of the rescue-secret key pair. As a consequence, the UE 140 has then been re-provisioned with a new TLS certificate for use in providing image data uploads on the second secure channel with the controller 130, and is able to do so with minimal time and involvement of the end user.

Figure 4:
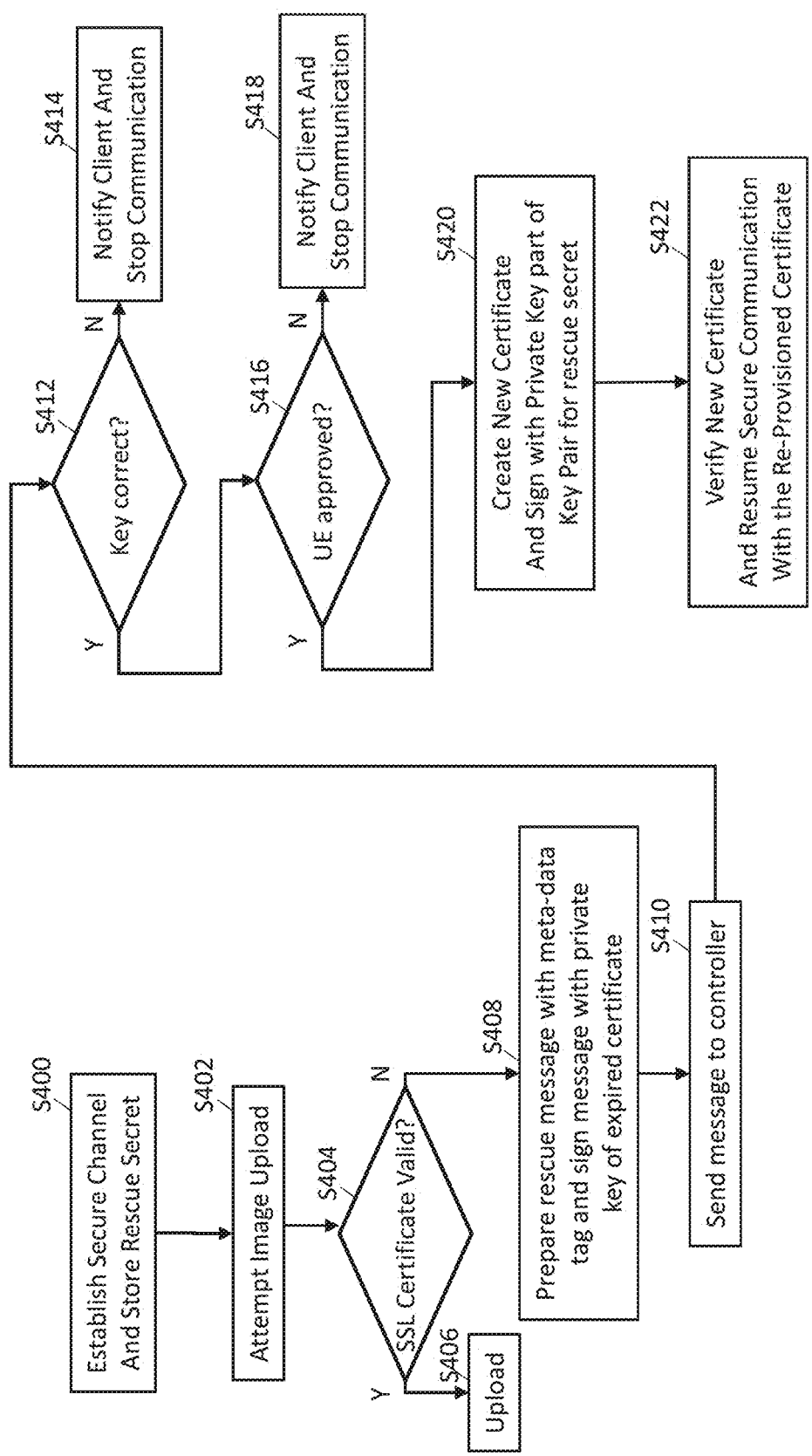
FIG. 4 is a flowchart of a re-provisioning process performed according to an embodiment.

FIG. 4 is a flowchart of a process flow implemented by the UE 140 and controller 130. The process begins in step S400 where the first secure channel is established between the UE 140 and controller 130 using a first public/private key pair, and in addition to provisioning a certificate to the UE, a rescue secret is created, which in this case is a second private/public key pair (rescue secret public/private key pair) discussed above with respect to FIG. 3. The controller 130 stores the rescue secret private key that may later be used in a rescue situation where the controller 130 signs a new certificate with the rescue secret private key prior, which the UE can then verify with a public key portion of the rescue secret key pair, which is saved at the UE 140 to be used in the rescue situation. The controller securely stores the rescue secret private key in memory along with a passphrase (or other secure unlock mechanism such as a biometric signature or the meta-data tag information sent from the UE 140 which corroborates the UE 140 having recorded the image file while the certificate was still valid) that is used to gain access to the rescue secret private key to be used for re-provisioning the UE 140 in a rescue situation.

The process then proceeds to step S402 where the UE 140 attempts to upload video and/or image data to the controller 130. Then, in step S404 a query is made regarding whether the UE's TLS certificate is still valid (i.e., not yet expired). If it has not yet expired, the process proceeds to step S406 where the data is uploaded over the first secure channel associated with the unexpired TLS certificate for use by the UE 140. However, if the response to the query is negative, the process proceeds to step S408 where the UE 140 prepares the certificate provisioning request message as will be discussed with respect to FIG. 5. The certificate provisioning request message optionally includes the meta-data tag information discussed above, and then the UE 140 signs the certificate provisioning request message with the private key of the expired TLS certificate. The process proceeds to step S410 where the UE 140 sends the message to the controller 130 via an unsecure channel.

In step S410 the controller 130 receives the certificate provisioning request message and verifies the signature with the UE 140's public key associated with the expired certificate. In step S412, a query is made regarding whether the request message was signed (or the entire message encrypted) with the private part of the key pair for the expired certificate. If the response to the query is negative, the process processes to step S414 where the UE 140 is notified and the communication is stopped. However, if the response to the query in step S412 is affirmative, the process proceeds to the query in step S416, where the content of certificate provisioning request message is evaluated by either an administrator who verifies that the UE 140 is an entity that should have his or her certificate re-provisioned, or automatically such as via evaluation of the meta-data tag information of the UE 140's image data file to determine if the image data file was recorded at a time when the original certificate was still valid. If the response is negative, the UE 140 is notified and the communication stops in step S418. However, if the response is affirmative, the process proceeds to step S420 where the controller 130 uses the passphrase (either entered by the Administrator, or the evaluation result of the meta-data tag evaluation) to access the private part of the key for re-provisioning a TLS certificate in the event of a rescue situation. In step S420, the controller 130 uses the private part of the key pair of the rescue secret key pair to sign the new TLS certificate before sending the signed TLS certificate to the UE 140. The process then proceeds to step S422 where the UE 140 uses the public key of the rescue secret key pair to verify the new TLS certificate and resume communication over the second secure communication channel. As an alternative to signing, the private key could be used for encrypting the entire certificate.

Figure 5:
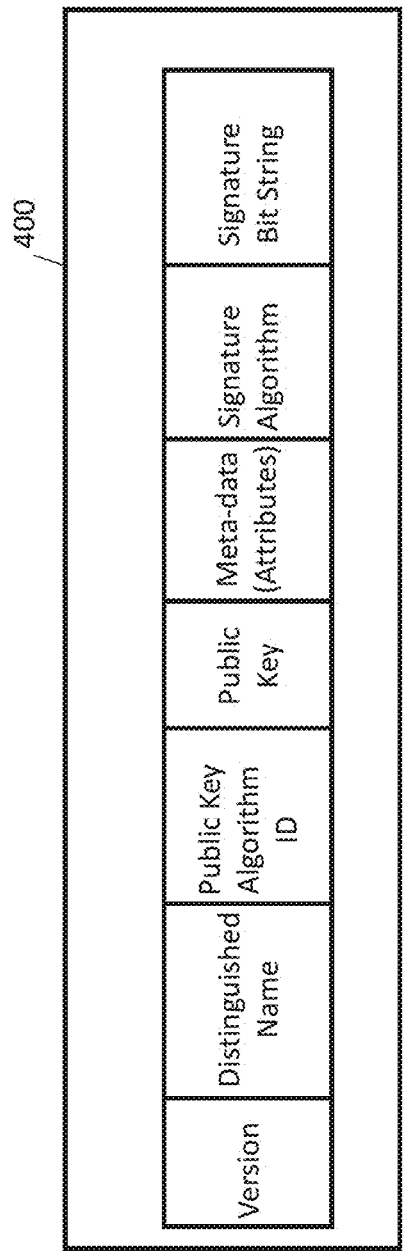
FIG. 5 is an exemplary structure of a PKCS #10 format, in accordance with an embodiment of the present disclosure.

FIG. 5 shows an exemplary data structure, 400, of a PKCS #10 format, in accordance with an embodiment of the present disclosure. However, the content of the data structure 400 may not standard because it is signed with the private key of the expired certificate and, in this embodiment, includes the meta-data tag information associated with an image data file recorded by the UE 140. The controller 130 has the public key of the expired certificate, and therefore is able to use it to verify the signature of the request message, and determine that the request message is valid.

As shown in FIG. 5, the request includes, but is not limited to, a data field with the version of the PKCS #10 standard. The next data field is the distinguished name (DN), which is the name of the entity for which the certificate is being request. The public key algorithm field provides an indicator of the algorithm used. The public key contains the UE 140's public key. The attributes field contains a collection of attributes that may be included with the request. The meta-data tag information associated with an image data file recorded by the UE 140 may be included here. The signature algorithm field identifies the algorithm used to sign the certification request. The signature bit string is the signature that is created using the UE 140's private key. Herein, it might be a case that the controller 130 may be connected to a certificate manager which is adapted to verify the information received in the request. Additionally, the certificate manager may access a database to find the public key and distinguished name of the entity. Also, the public key and the signature are verified by the controller 130 through the certificate manager. Moreover, the private key is requested by the controller 130 from the UE 140.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof. It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publicly accessible network such as the Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Figure 6:
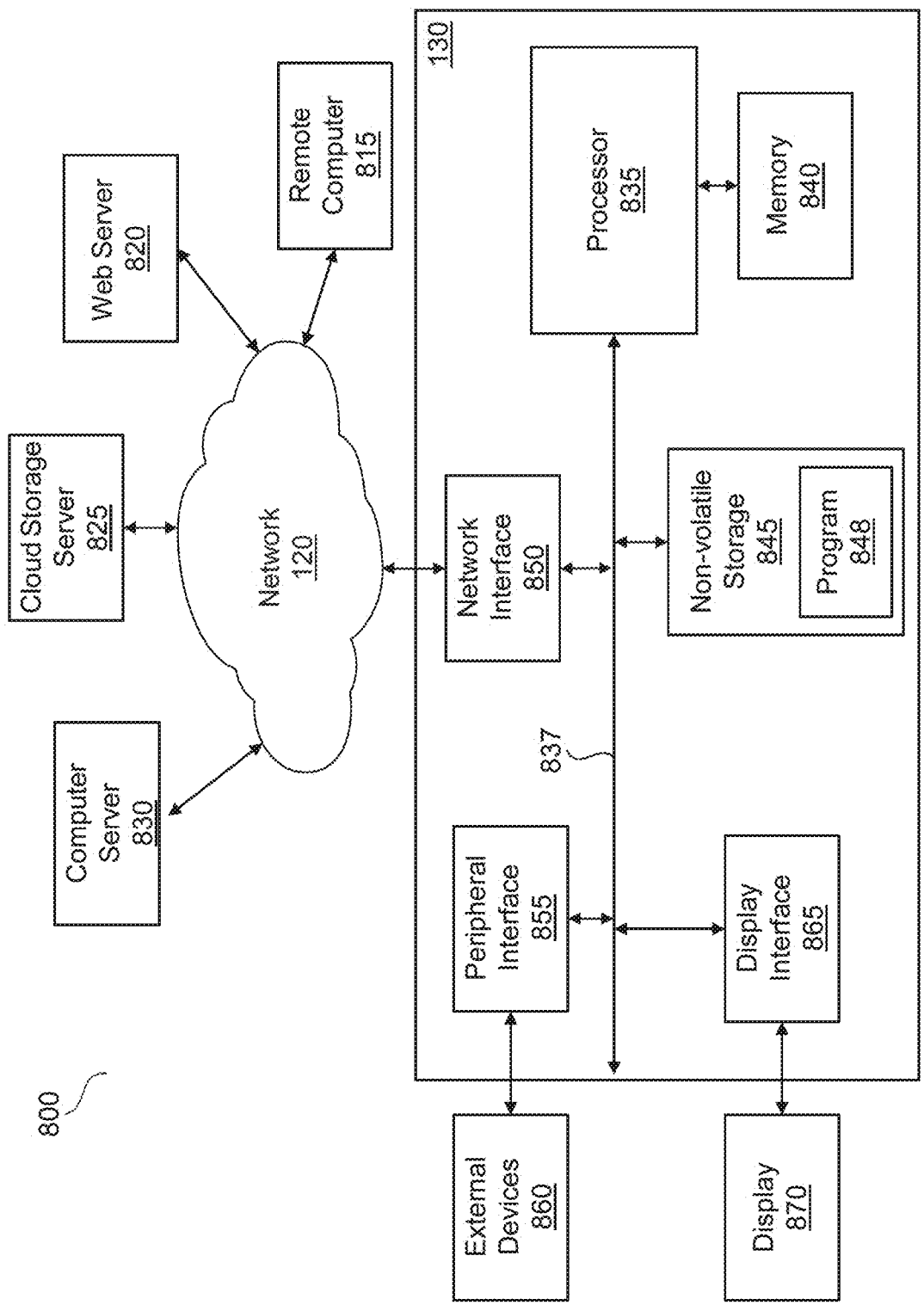
FIG. 6 is a block diagram of a computer-based system on which embodiments of the present system may be implemented.

FIG. 6 is a functional block diagram illustrating a networked system 800 of one or more networked computers and servers. In an embodiment, the hardware and software environment illustrated in FIG. 6 may provide an exemplary platform for implementation of the software and/or methods according to the present disclosure, including a structure of the controller 130 or a relay computer that connects to the UE 140.

Referring to FIG. 6, a networked system 800 may include, but is not limited to, computer 805, network 810, remote computer 815, web server 820, cloud storage server 825 and computer server 830. In some embodiments, multiple instances of one or more of the functional blocks illustrated in FIG. 6 may be employed.

Additional detail of computer 805 is shown in FIG. 6. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, notebook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for re-provisioning a user equipment (UE) with a second digital security certificate provisioned by a controller after a first digital security certificate has expired, the method comprising:
   during an initial setup between the controller and the UE performing the acts of:
      establishing a first secure channel between the UE and the controller using a first public/private key pair,
      providing the first digital security certificate by the controller to the UE over the first secure channel, and
      storing a rescue-secret private key at the controller and storing a rescue-secret public key at the UE, the rescue-secret private key and the rescue-secret public key being a rescue-secret public/private key pair that is different than the first public/private key pair, the rescue-secret public key being provided by the controller to the UE over the first secure channel;
   the method further comprising:
   determining by the UE that the first digital security certificate has expired;
   sending by the UE a certificate provisioning request message over an unsecure channel to the controller as a request to the controller to provision the UE with the second digital security certificate, the certificate provisioning request message being signed by a private key of the first public/private key pair;
   using a public key of the first public/private key pair at the controller to verify the certificate provisioning request message, and once verified, accessing at the controller the rescue-secret private key stored in secure memory at the controller via entry of access information by the controller;
   signing at the controller the second digital security certificate with the rescue-secret private key and sending the signed second digital security certificate from the controller to the UE; and
   after verifying the signed second digital security certificate at the UE using the rescue-secret public key, the UE resumes communication with the controller over another secure communication channel using the second digital security certificate.

2. The method of claim 1, wherein the first digital security certificate and the second digital security certificate each being one of a Transport Layer Security (TLS) certificate or a Secure Socket Layer (SSL) certificate.

3. The method of claim 1, wherein the access information comprising at least one of a passphrase, and biometric data.

4. The method of claim 1, wherein:
the access information including a meta-data tag set by the UE when capturing content data in memory, and
the accessing includes identifying from the meta-data tag whether the content data captured when the first digital security certificate was still valid.

5. The method of claim 1, wherein the resuming includes applying the rescue-secret public key to verify a signature of the second digital security certificate.

6. The method of claim 1, wherein the accessing includes automatically accessing the rescue-secret private key in response to entry of the access information.

7. The method of claim 1, wherein the communicating includes sending content data to the controller, the content data including at least one of image, video, audio and a feature extracted from data captured by the UE.

8. The method of claim 1, further comprising:
capturing at the UE content data as image data with a camera, the image data includes images in at least one of a visible, an ultraviolet, or an infrared spectral range.

9. The method of claim 1, wherein the sending includes sending the certificate provisioning request message in a PKCS #10 message format that includes a meta-data tag of content data.

10. A user equipment (UE), comprising:
a housing configured to be mounted to a movable platform;
a camera contained in the housing, the camera including imaging circuitry configured to capture content data;
a memory that holds a private key of a first public/private key pair, and a rescue-secret public key of a rescue-secret public/private key pair that is different than the first public/private key pair, wherein a rescue-secret private key of the rescue-secret public/private key pair is held in a secure memory at a controller and is accessible by the controller by entry of access information at the controller; and
circuitry configured to:
determine that a first digital security certificate has expired and the UE cannot upload the content data over a first secure communication channel to the controller,
sign a certificate provisioning request message with the private key of the first public/private key pair associated with the first digital security certificate after the circuitry determines that the first digital security certificate has expired, and send a signed certificate provisioning request message over an unsecure channel to the controller as a request to the controller to provision a second digital security certificate,
receive the second digital security certificate from the controller in response to the controller using the at least a portion of the access information to retrieve the rescue-secret private key that is used by the controller to sign the second digital security certificate, and
verify, by the UE, the signed second digital security certificate with the rescue-secret public key of the rescue-secret public/private key pair, and resume secure communication with the controller over another secure communication channel using the second digital security certificate.

11. The UE of claim 10, wherein:
the camera being configured as a wearable device worn by a law enforcement officer, and further comprising a rechargeable battery that provides electrical power to the UE when in field use, and/or
the camera being configured as at least one of a dash-cam and a vehicle mounted camera, and configured to receive DC power from a vehicle, and/or
the camera is configured to capture images in at least one of a visible, an ultraviolet, or an infrared spectral range.

12. The UE of claim 10, wherein
the access information is a meta-data tag set by the UE when capturing content data, and the circuitry is configured generate the meta-data tag to identify when the content data was recorded as an indication to the controller whether the content data was recorded prior to an expiration of the first digital security certificate.

13. The UE of claim 10, wherein the circuitry is configured to apply the rescue-secret public key of the rescue-secret public/private key pair to verify a signature of the second digital security certificate.

14. The UE of claim 10, wherein the content data including at least one of image, video, audio and a feature extracted from data captured by the UE.

* * * * *